United States Patent
Lee et al.

(10) Patent No.: US 8,112,552 B2
(45) Date of Patent: Feb. 7, 2012

(54) DEFAULT PERIPHERAL DEVICE SELECTION BASED ON LOCATION

(75) Inventors: Jian Lee, Sammamish, WA (US); Frank Olivier, Seattle, WA (US); Tao Yuan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 12/036,292

(22) Filed: Feb. 25, 2008

(65) Prior Publication Data

US 2009/0216912 A1 Aug. 27, 2009

(51) Int. Cl.
  *G06F 3/00* (2006.01)
  *G06F 15/173* (2006.01)
(52) U.S. Cl. .............................. 710/8; 709/226
(58) Field of Classification Search ....... 710/8; 709/226
  See application file for complete search history.

(56) References Cited

U.S. PATENT DOCUMENTS

| | | | |
|---|---|---|---|
| 5,694,618 A | 12/1997 | Hibino | |
| 5,903,716 A | 5/1999 | Kimber et al. | |
| 6,045,206 A * | 4/2000 | Igval | 347/2 |
| 6,184,998 B1 | 2/2001 | Tebeka | |
| 6,738,808 B1 * | 5/2004 | Enzmann et al. | 709/223 |
| 6,967,728 B1 | 11/2005 | Vidyanand | |
| 6,983,317 B1 | 1/2006 | Bishop et al. | |
| 7,016,740 B2 | 3/2006 | Nakamura et al. | |
| 7,424,532 B1 * | 9/2008 | Subbiah | 709/226 |
| 2003/0011811 A1 * | 1/2003 | Clough | 358/1.15 |
| 2004/0236789 A1 | 11/2004 | Uchida et al. | |
| 2005/0280858 A1 | 12/2005 | Kim | |
| 2006/0023246 A1 | 2/2006 | Vidyanand | |
| 2006/0090143 A1 | 4/2006 | Tanaka | |
| 2006/0200834 A1 | 9/2006 | Cukierman et al. | |
| 2006/0221385 A1 | 10/2006 | Ohara et al. | |

OTHER PUBLICATIONS

Net Switch 2.1, 2006, www.net-switch.com, 1-3.*
Mobile Net Switch manual, 2008, www.mobilenetswitch.com, 1-37.*
Ethridge, 'Disable auto-detect new hardware—should I? Can I?', Aug. 22, 2007.*
Simondson, "Free DEFSET GUI manages default printer settings in Citrix and Terminal Server environments", Copyright 1997-2007, The Brian Madden Company, LLC, pp. 2.
"Using Central Printers from Linux", IT Iowa State University, LAG 320 / Jul. 2006, pp. 4.
"How to Set Which Printer is the System Default Printer", 2007, Microsoft Corporation, pp. 6.
"Take Control of Your Printing", PCMAG.COM, retrieved at <<http://www.pcmag.com/article2/0,2704,1553698,00.asp>>, pp. 3.

* cited by examiner

*Primary Examiner* — Henry Tsai
*Assistant Examiner* — Hyun Nam

(57) ABSTRACT

In accordance with one or more aspects of the default peripheral device selection based on location, a current location of a computing device is obtained. A mapping record of default peripheral devices to locations is accessed to identify a default peripheral device corresponding to the current location of the computing device, and the identified default peripheral device is returned as a current default peripheral device for the computing device. Additionally, an identification of a peripheral device to be a default peripheral device can be received. A mapping of the current location of the computing device to the identified default peripheral device can also be stored.

17 Claims, 6 Drawing Sheets

DEFAULT PERIPHERAL DEVICE SELECTION BASED ON LOCATION

BACKGROUND

Many current computing devices are portable devices that are coupled to different networks at different times. For example, a user may have a portable computing device that is coupled to an office network during the day and to a home network during the evening. While the ability to easily connect the same computing device to different networks can be very advantageous, various problems also arise. One such problem is the setting of a default peripheral device. Computing devices typically allow a default peripheral device to be set, such as a default printer. Unfortunately, as this default peripheral device is typically available on only one of the networks, the user typically needs to change the default peripheral device setting each time the network that the computing device is coupled to changes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the default peripheral device selection based on location, a current location of a computing device is obtained. A mapping record of default peripheral devices to locations is accessed to identify a default peripheral device corresponding to the current location of the computing device. Additionally, the identified default peripheral device is returned as a current default peripheral device for the computing device.

In accordance with one or more aspects of the default peripheral device selection based on location, an identification of a peripheral device to be a default peripheral device is received. A current location of the computing device is obtained, and a mapping of the current location of the computing device to the identified default peripheral device is stored.

In accordance with one or more aspects of the default peripheral device selection based on location, a user interface is displayed on a computing device. The user interface has a first portion including one or more options allowing a user to select whether a default peripheral device is not to change based on a location of the device or whether the default peripheral device is to change based on the location of the device. The user interface also has a second portion including one or more options allowing the user to select a particular one of multiple peripheral devices to be a default peripheral device for each of multiple locations.

BRIEF DESCRIPTION OF THE DRAWINGS

The same numbers are used throughout the drawings to reference like features.

DETAILED DESCRIPTION

Default peripheral device selection based on location is discussed herein. Computing devices can be coupled to different networks, and the computing devices maintain a record mapping each of these different networks to a particular default peripheral device. When the user desires to access a peripheral device, the default peripheral device for the particular network that the user is currently coupled to is automatically selected for the user. A user interface can also optionally be displayed to the user, allowing the user to identify particular networks and corresponding peripheral devices for those networks.

Figure 1:
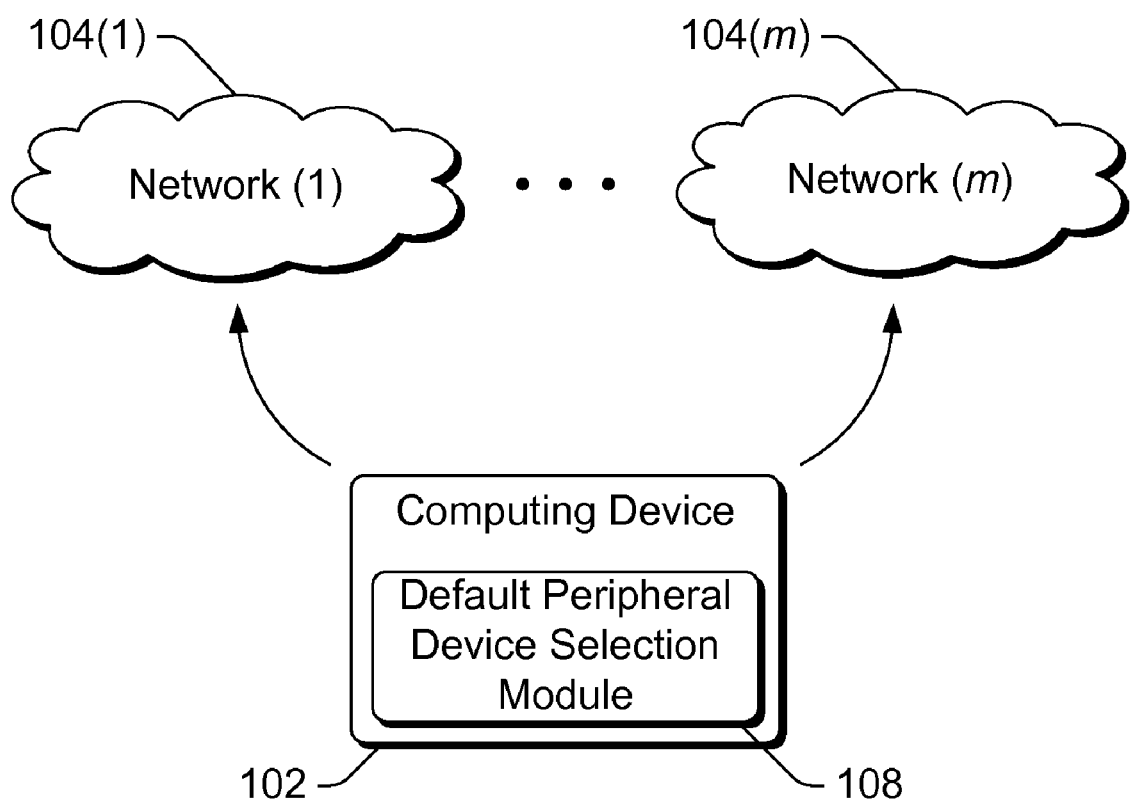
FIG. 1 illustrates an example system implementing the default peripheral device selection based on location in accordance with one or more embodiments.

FIG. 1 illustrates an example system 100 implementing the default peripheral device selection based on location in accordance with one or more embodiments. System 100 includes a computing device 102 that can be coupled to one or more (m) networks 104. Each network 104 is typically a local area network (LAN), although other types of networks can also be included as a network 104, such as the Internet, a public telephone network, an intranet, other public and/or proprietary networks, combinations thereof, and so forth. Each network 104 can be implemented using any of a variety of public and/or proprietary protocols.

Computing device 102 can be any of a variety of devices. Computing device 102 is typically a portable device, such as a laptop computer, a personal digital assistant (PDA), a wireless phone, a mobile station, a game console, an automotive computer, and so forth. However, computing device 102 can also be other devices, such as a desktop computer, a set-top box communicatively coupled to a display device, an entertainment appliance, and so forth. Thus, computing device 102 may range from a full resource device with substantial memory and processor resources (e.g., personal computers, game consoles) to a low-resource device with limited memory and/or processing resources (e.g., wireless phones, hand-held game consoles).

Computing device 102 includes a default peripheral device selection module 108. Default peripheral device selection module 108 automatically selects a particular default peripheral device for computing device 102 that is based on a current location of computing device 102, such as which network 104 computing device 102 is coupled to. For example, module 108 can maintain a record of different default printers for different networks 104, and automatically select the correct default printer for a first network 104 when computing device 102 is coupled to that first network 104, and automatically select the correct default printer for a second network 104 when computing device 102 is coupled to that second network 104.

In one or more embodiments, the peripheral devices are printers. Alternatively, other types of peripheral devices can be used with the techniques discussed herein, such as scanners, fax machines, cameras, storage devices (e.g., hard disk drives), digital music players, and so forth. Different types of default peripheral devices can be automatically selected by module 108, or different modules 108 can be included for each of different types of peripheral devices.

The networks 104 can be any of a variety of different networks that computing device 102 can be coupled to. The default peripheral device selection based on location discussed herein allows computing device 102 to automatically select the default peripheral device for the user. This automatic selection relieves the user from needing to set the default peripheral device each time computing device 102 is coupled to a different network 104, and further relieves the user from needing to remember which default peripheral device he or she prefers for different networks 104. For example, computing device 102 can automatically select a first printer as the default printer when computing device 102 is coupled to the user's work network, a second printer when computing device 102 is coupled to the user's home network, and a third printer when computing device 102 is coupled to a network in a hotel that the user frequently visits. Following this example, the user can simply select a "print" option for an application running on computing device 102 and have the desired document printed at the default printer for the appropriate location (e.g., at the first printer if the user is at work, at the second printer if the user is at home, and at the third printer if the user is at the hotel).

Figure 2:
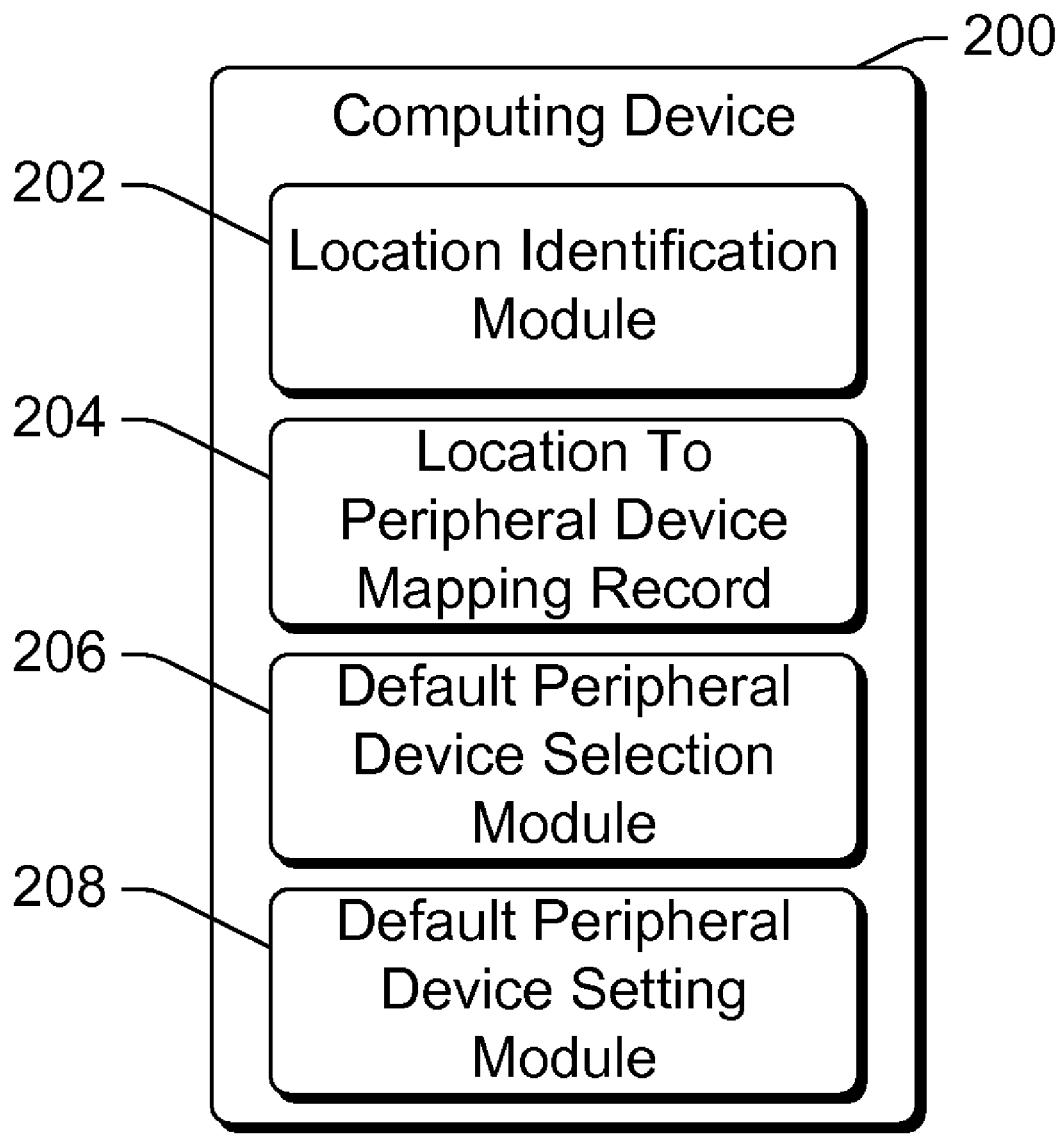
FIG. 2 is a block diagram illustrating an example computing device implementing the default peripheral device selection based on location in accordance with one or more embodiments.

FIG. 2 is a block diagram illustrating an example computing device 200 implementing the default peripheral device selection based on location in accordance with one or more embodiments. Consumer device 200 can be any of a variety of devices, and in one or more embodiments is a computing device 102 of FIG. 1. Consumer device 200 includes a location identification module 202, a location to peripheral device mapping record 204, a default peripheral device selection module 206, and a default peripheral device setting module 208.

Location identification module 202 determines a current location of computing device 200. In one or more embodiments, this current location is a network location. A network location refers to an identification of a particular network to which computing device 200 is currently coupled. The network location can be determined by module 202 in any of a variety of different manners.

In one or more embodiments the network location is determined by identifying a network adapter coupling computing device 200 to the network as well as a Media Access Control (MAC) address of the default gateway of the network. The network adapter can be identified by type (e.g., RJ45 port, wireless adapter, Universal Serial Bus (USB) port, etc.), or by specific network adapter (e.g., a MAC address of the network adapter). This combination of network adapter identifier and MAC address of the default gateway operate to identify a particular network to which computing device 200 is coupled. As different networks will typically have a different default gateway and/or be coupled to computing device 200 using different network adapters of device 200, this combination can uniquely identify different networks to which computing device 200 can be coupled.

Alternatively, other techniques could be used to determine the network location. For example, computing device 200 can be coupled to a network supporting different domains and/or workgroups. Each of these different domains and/or workgroups can be identified as different networks by location identification module 202.

It should be noted that situations can arise where location identification module 202 is coupled to multiple different networks concurrently. In such situations, location identification module 202 selects one of these multiple networks as the current location of computing device 200. The selection of one of the multiple networks can be performed in different manners, such as randomly, in accordance with some order set by a designer, administrator, or other user of computing device 200, and so forth. In one or more embodiments, module 202 makes this selection based on categorizing networks into three different levels. The first level is an authenticated level in which the network is managed by a domain controller and computing device 200 is authenticated to the domain controller. The second level is a managed level in which the network is managed by a domain controller but computing device 200 is not authenticated to the domain controller. The third level is an unmanaged level in which the network is not managed by a domain controller. Using these three levels, module 202 prioritizes networks that computing device 200 is coupled to such that a network in the first level is first selected. If no network is in the first level, then a network in the second level is selected. And, if no network is in the first level or the second level, then a network in the third level is selected.

In one or more embodiments, the network location is identified by invoking functionality of an operating system running on computing device 200 that identifies the network to which computing device 200 is coupled at any given time. For example, various Windows® operating systems available from Microsoft Corporation of Redmond, Wash. (such as the Windows Vista® operating system) includes a network location awareness component that can be accessed. Location identification module 202 can invoke functionality of the network location awareness component to obtain an indication of the current network to which computing device 200 is coupled and/or to receive notifications from the network location awareness component of when changes to the network to which computing device 200 is coupled occur.

Alternatively, rather than relying on the network location, the current location of computing device 200 can be identified in any of a variety of other manners. For example, computing device 200 can optionally include or otherwise receive global positioning system (GPS) coordinate data from a GPS component. This GPS coordinate data indicates the current location of computing device 200, and can be used as the current location rather than the network location. This GPS coordinate data can optionally be broadened out to include a wider range, such as a 100-foot radius or 1000-foot radius around the geographic point represented by the GPS coordinate data. This broadening allows general locations (e.g., the user's home) to be identified as a single network rather than a different network being identified in each room of the user's home due to the rooms being in different physical locations (and thus corresponding to different GPS coordinates).

Location identification module 202 can make the current location of computing device 200 available to other components, such as default peripheral device selection module 206 and default peripheral device setting module 208, in any of a variety of different manners. In one or more embodiments, location identification module 202 exposes an application programming interface (API) function or method that can be invoked or otherwise accessed by these other components in order to obtain the current location of computing device 200 from module 202. Alternatively, other techniques can be used, such as module 202 maintaining the current location in a particular file, table, or other record that is accessible to these other components.

Location to peripheral device mapping record 204 is a record of mappings of default peripheral devices to different locations. As discussed above, these locations can be network locations, locations based on GPS coordinates, or any other identifications of locations. In one or more embodiments, record 204 is stored as a table in a registry of an operating system running on computing device 200. Alternatively, record 204 can be stored elsewhere on computing device 200 or stored on another device or component accessible to computing device 200.

Location to peripheral device mapping record 204 identifies different locations and corresponding default peripheral devices. The locations can be stored using any of a variety of nomenclature, such as using whatever identifier of the location is identified by location identification module 202. Optionally, one or more locations can have a user-friendly name that is assigned by the user or an administrator. This user-friendly name is an identifier of the location that is easy for the user to associate with (e.g., "work", "home", "business center", etc.). This user-friendly name can be obtained by location identification module 202, such as a network name, domain name, group name, etc. that is accessible to module 202. Alternatively, this user-friendly name can be assigned by the user. This user-friendly name can also be maintained in record 204 as being associated with the corresponding location, allowing the user-friendly name to be subsequently displayed to the user in order to identify the location to the user.

In one or more embodiments, the locations in mapping record 204 are network locations as discussed above. In such embodiments, situations can arise where computing device 200 is not coupled to any network. Accordingly, one entry in mapping record 204 can be a "no network" or similar location.

The default peripheral devices can be identified in mapping record 204 in any of a variety of different manners. In one or more embodiments, the default peripheral devices in mapping record 204 are identified by a path name or network address that identifies how to access the default peripheral devices via the network. Alternatively, other identifiers of the default peripheral devices can be used, and another component of computing device 200 (or another device or component coupled to computing device 200) can maintain a mapping of these identifiers to particular network locations for the default peripheral devices.

Default peripheral device selection module 206 automatically selects a default peripheral device given a current location of computing device 200. The current location of computing device 200 is obtained from location identification module 202 as discussed above. Once the current location of computing device 200 is obtained, module 206 accesses mapping record 204 to identify the default peripheral device corresponding to the current location of computing device 200. Module 206 searches mapping record 204 to identify a location in mapping record 204 that matches (is the same as) the current location of computing device 200. Once identified, the default peripheral device corresponding to the identified location in mapping record 204 is obtained from mapping record 204. Module 206 then selects this default peripheral device obtained from mapping record 204 to be the current default peripheral device for computing device 200.

It should be noted that situations can arise in which no location in mapping record 204 matches the current location of computing device 200. Such situations can be resolved in any of a variety of manners. In one or more embodiments, computing device 200 is compatible with legacy techniques in which only a single default peripheral device can be set. Such legacy techniques require the user to manually change the default peripheral device in order to use the default peripheral device for a new location. A record of this legacy default peripheral device is maintained by computing device 200 (e.g., in a registry of an operating system running on computing device 200 or elsewhere). If no location in mapping record 204 matches the current location of computing device 200, then the record of this legacy default peripheral device is accessed by module 206 and the peripheral device identified in this record is selected by module 206 to be the current default peripheral device for computing device 200.

Alternatively, situations in which no location in mapping record 204 matches the current location of computing device 200 can be resolved in other manners. For example, default peripheral device selection module 206 can select no default peripheral device. An indication that no default peripheral device can be identified can optionally be presented to the user, allowing the user to select a default peripheral device for the current location. This selection can then be stored in mapping record 204 as discussed in more detail below, thereby allowing module 206 to subsequently select this default peripheral device for the current location.

In one or more embodiments, default peripheral device selection module 206 is included as part of an API module that is invoked whenever access to a default peripheral device is requested by another component of computing device 200. For example, whenever a user of computing device 200 makes a request to print a document, an application and/or the operating system on computing device 200 can request a default printer for computing device 200. This allows the user to, for example, select a quick print option (e.g., a menu option, an on-screen button, a key sequence such as Ctrl-P, etc.) and have the document automatically printed to the default printer for computing device 200.

This API module can be invoked in any of a variety of different manners. In one or more embodiments supporting one or more of the Windows® operating system family of operating systems available from Microsoft Corporation, for peripheral devices that are printers this API module is accessed by invoking a GetDefaultPrinter function.

Alternatively, default peripheral device selection module 206 can operate to automatically detect whenever a change in the current location occurs and select the default peripheral device for the new location in response to detecting a change. This change in current location can be automatically detected in any of a variety of different manners. For example, location identification module 202 can monitor the current location and record changes to the current location as they occur. Module 202 can maintain these changes in a record, such as a file or table accessible to default peripheral device selection module 206. Module 206 in turn accesses this record at regular or irregular intervals to identify changes in current location. When module 206 identifies that the current location recorded in this record is different than the last time module 206 accessed this record, then module 206 detects that a change has occurred and selects the default peripheral device for the new location. By way of another example, location identification module 202 can monitor the current location of computing device 200 and send a message or other notification to default peripheral device selection module 206 whenever module 202 detects a change in the current location.

Default peripheral device setting module 208 operates to store mappings of current locations of computing device 200 to particular default peripheral devices in mapping record 204. Default peripheral device setting module 208 receives an identification of a peripheral device that a user desires to be a default peripheral device. This identification can be received in any of a variety of different manners. In one or more embodiments, when a user installs a new peripheral device on computing device 200, the installation process assumes that the user desires to have the new peripheral device be the default peripheral device. Accordingly, the installation process notifies module 208 that the newly installed peripheral device is to be the default peripheral device. Alternatively, module 208 can monitor a record of peripheral devices (e.g., maintained in a registry of an operating system running on computing device 200 or elsewhere) and identify when a new peripheral device has been installed on computing device 200. Such a new peripheral device can be automatically identified as the default peripheral device by module 208.

In other embodiments, a user of computing device 200 inputs a request that a particular peripheral device be the default peripheral device. This request can be input by the user during the installation process, or alternatively can be input at other times. For example, the user can request that a list of the various peripheral devices be displayed and the user can select from that list which particular peripheral device he or she desires to be the default peripheral device.

Additionally, default peripheral device setting module 208 obtains the current location of computing device 200 from location identification module 202. This current location can be obtained from location identification module 202 in any of a variety of manners as discussed above. Default peripheral device setting module 208 records, in mapping record 204, the mapping of the current location obtained from location identification module 202 to the identified peripheral device. If the current location does not already exist in mapping record 204 then a new entry is added to mapping record 204 for the current location and corresponding default peripheral device. If the current location already exists in mapping record 204 then the corresponding peripheral device in mapping record 204 is replaced by the identified peripheral device.

In one or more embodiments, default peripheral device setting module 208 is included as part of an API module that is invoked whenever a user requests to set a particular peripheral device as a default peripheral device. This request can be made during installation of the peripheral device on computing device 200, or alternatively can be made at other times. This API module can be invoked in any of a variety of different manners. In one or more embodiments supporting one or more of the Windows® operating system family of operating systems available from Microsoft Corporation, for peripheral devices that are printers this API module is accessed by invoking a SetDefaultPrinter function.

Additionally, in one or more embodiments module 208 obtains an identification of the location from the user of computing device 200 rather than from location identification module 202. The user can input the identification of the location in any of a variety of different manners. In one or more embodiments, a user interface is displayed to the user allowing the user to select a particular location (e.g., network) and corresponding default peripheral device. The location selected by the user can be, but need not be, the current location of computing device 200.

As discussed above, the default peripheral device selection based on location can be used with any of a variety of different types of peripheral devices. In one or more embodiments, a separate record 204 and separate modules 206 and 208 are employed for each different type of peripheral device. For example, a first record 204 and modules 206 and 208 are used for printers, a second record and modules 206 and 208 are used for scanners, and so forth. In other embodiments, a single record 204 stores the default peripheral device to location mappings for multiple types of devices. Additional information can optionally be included in record 204 identifying the particular type of peripheral device that the mapping is for. In such embodiments, the same module 206 and 208 can be used for the different types of peripheral devices, or alternatively different modules 206 and 208 can be used for each different type of peripheral device.

Figure 3:
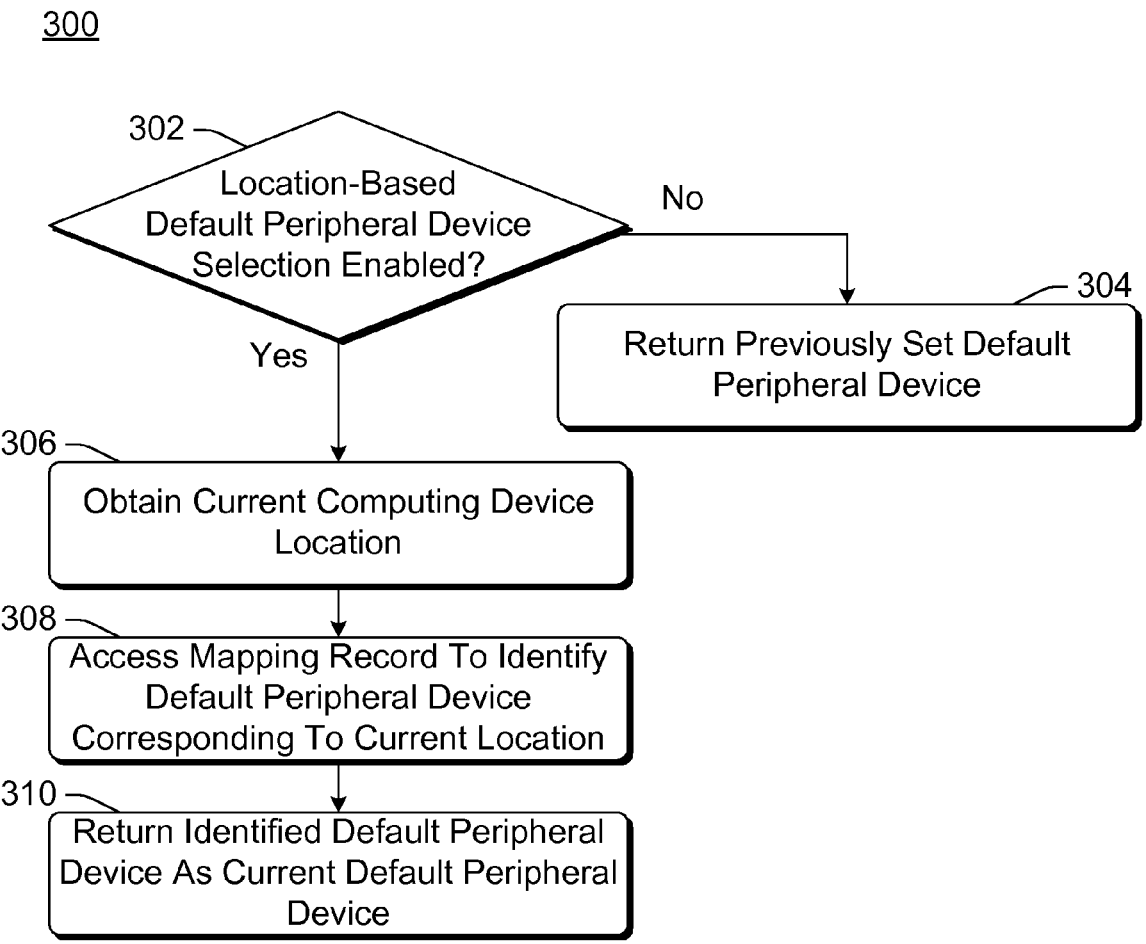
FIG. 3 is a flowchart illustrating an example process for identifying and returning a default peripheral device based on location in accordance with one or more embodiments.

FIG. 3 is a flowchart illustrating an example process 300 for identifying and returning a default peripheral device based on location in accordance with one or more embodiments. Process 300 is carried out by a computing device, such as computing device 102 of FIG. 1 or computing device 200 of FIG. 2, and can be implemented in software, firmware, hardware, or combinations thereof. Process 300 is an example process for identifying and returning a default peripheral device based on location; additional discussions of identifying and returning a default peripheral device based on location are included herein with reference to different figures.

Process 300 is typically performed in response to a request to access a default peripheral device. This request is received from a requestor that is another component or module of the computing device implementing process 300, such as an operating system component, an application, and so forth.

Initially, a check is made as to whether default peripheral device selection based on location is enabled (act 302). If default peripheral device selection based on location is disabled, then a single peripheral device previously set as the default peripheral device is returned to the requestor (act 304). This single peripheral device is the default peripheral device used by legacy techniques as discussed above. The default peripheral device selection based on location can optionally be enabled and/or disabled by default settings on the computing device implementing process 300, by an administrator or other user, and so forth.

If default peripheral device selection based on location is enabled, then the current computing device location is obtained (act 306). A mapping record is then accessed to identify a default peripheral device that corresponds to the current location (act 308). An identification of the default peripheral device identified in act 308 is returned to the requestor as the current default peripheral device (act 310). If no default peripheral device corresponding to the current computing device location is found in the mapping record in act 308, then any of a variety of different actions can be taken as discussed above. For example, an indication that there is no default peripheral device for the current location can be returned, an indication that the user can set a default peripheral device can be displayed to the user, and so forth.

Figure 4:
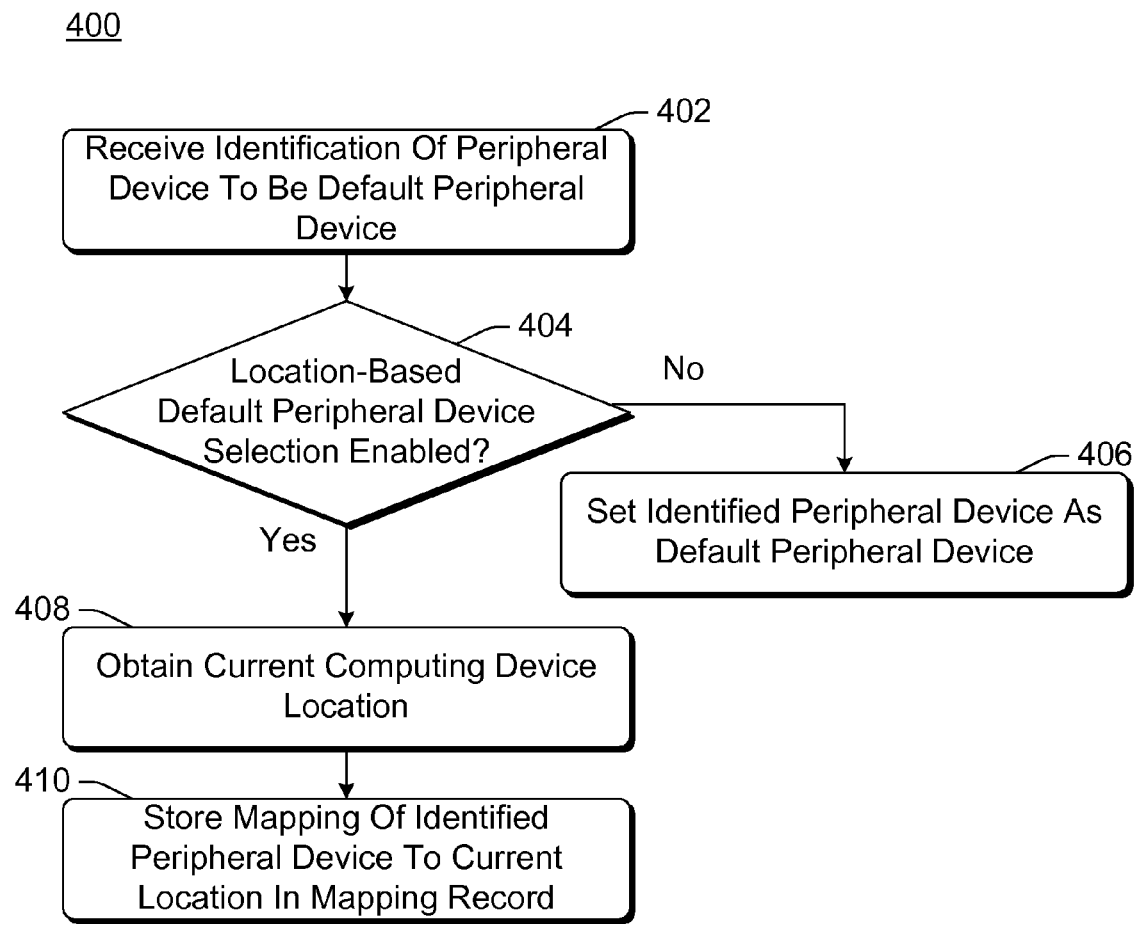
FIG. 4 is a flowchart illustrating an example process for setting a default peripheral device based on location in accordance with one or more embodiments.

FIG. 4 is a flowchart illustrating an example process 400 for setting a default peripheral device based on location in accordance with one or more embodiments. Process 400 is carried out by a computing device, such as computing device 102 of FIG. 1 or computing device 200 of FIG. 2, and can be implemented in software, firmware, hardware, or combinations thereof. Process 400 is an example process for setting a default peripheral device based on location; additional discussions of setting a default peripheral device based on location are included herein with reference to different figures.

Process 400 is typically performed in response to a request to set a default peripheral device. This request is received from a requestor that is another component or module of the computing device implementing process 400, such as an operating system component, an application, and so forth.

Initially, an identification of peripheral device to be the default peripheral device is received (act 402). A check is then made as to whether default peripheral device selection based on location is enabled (act 404). If default peripheral device selection based on location is disabled, then the peripheral device identified in act 402 is set as the single default peripheral device for the computing device implementing process 400 (act 406). This single default peripheral device is the default peripheral device used by legacy techniques as discussed above. The default peripheral device selection based on location can optionally be enabled and/or disabled by default settings on the computing device implementing process 400, by an administrator or other user, and so forth.

If default peripheral device selection based on location is enabled, then the current computing device location is obtained (act 408). A mapping of the peripheral device identified in act 402 to the current location obtained in act 408 is then stored in a mapping record (act 410). This storing of the mapping in act 410 allows the peripheral device identified in act 402 to be subsequently identified as the default peripheral device for the location obtained in act 408.

Figure 5:
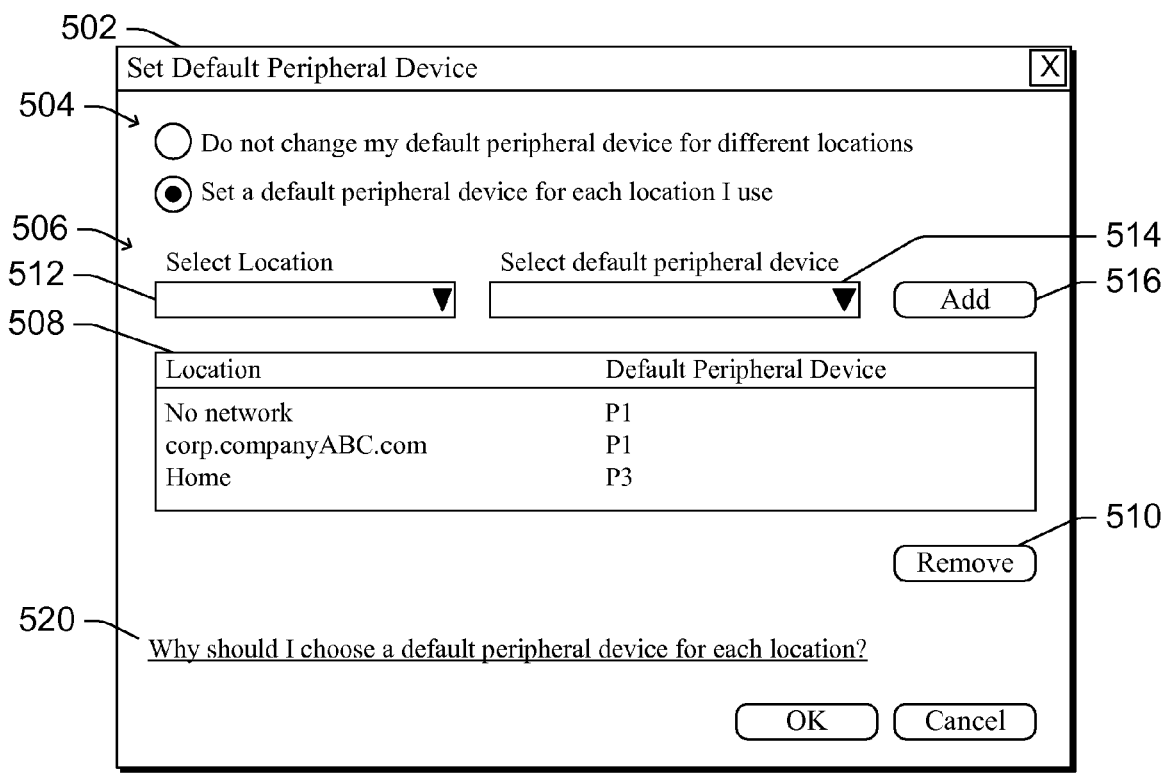
FIG. 5 illustrates an example user interface for use with the default peripheral device selection based on location discussed herein in accordance with one or more embodiments.

FIG. 5 illustrates an example user interface 500 for use with the default peripheral device selection based on location discussed herein in accordance with one or more embodiments. In user interface 500 a window or dialog box 502 is displayed including a first portion 504 and a second portion 506. Various options, buttons, pull-down menus, and so forth displayed via user interface 500 can be selected by a user in any of a variety of conventional manners. For example, a selection can be made by using an "Enter" key on a keyboard, using a pointer and cursor control device (and pressing a button on the cursor control device), and so forth.

First portion 504 includes one or more options allowing a user to select whether a default peripheral device is not to change based on a current location (so that the default peripheral device selection based on location is disabled), or whether the default peripheral device is to change based on the current location (so that the default peripheral device selection based on location is enabled). In the example of FIG. 5 the options in portion 504 are displayed as radio buttons or option buttons, although alternatively the options can be displayed using different techniques (e.g., pull-down menus, other buttons, and so forth).

Second portion 506 includes one or more options allowing the user to select a particular one of multiple peripheral devices to be a default peripheral device for each of multiple locations. In one or more embodiments, second portion 506 allows the user to make such selections only if the default peripheral device selection based on location is enabled.

Portion 506 includes a listing 508 of location to peripheral device mappings. These mappings are obtained, for example, from mapping record 204 of FIG. 2. Listing 508 allows the user to review the particular mappings of locations to peripheral devices. The user can optionally remove a mapping by selecting the mapping in any of a variety of conventional manners. The selected mapping is highlighted, and the user can select a "Remove" button 510 to have the mapping removed from the mapping record (e.g., mapping record 204 of FIG. 2).

In one or more embodiments the user is also able to rename locations. This can be accomplished by the user selecting a particular location in any of a variety of conventional manners, such as by maneuvering a pointer over the location in list 508 and right-clicking on a cursor control device button to bring up an option menu, by selecting a "rename" button (not shown), and so forth. The user is then presented with a data entry box or field allowing the user to enter a name for the selected location. This user-entered name is then stored in the mapping record (e.g., mapping record 204 of FIG. 2). This allows the user-entered location name to be displayed to the user.

Portion 506 includes a pull-down menu 512 allowing the user to select a particular location, and a pull-down menu 514 allowing the user to select a particular default peripheral device. Pull-down menu 512 displays a list of locations that the computing device generating user interface 500 has been at or alternatively is aware of. These locations can be, for example, a list of networks that the computing device has been coupled to. Pull-down menu 514 displays a list of peripheral devices that are installed on the computing device generating user interface 500. The user can select a location from pull-down menu 512 and a peripheral device from pull-down menu 514. The user can then select "Add" button 516 to have the selected location and selected peripheral device stored in the mapping record (e.g., mapping record 204 of FIG. 2) as a location and corresponding default peripheral device. The new mapping is also displayed in list 508.

Various other information regarding the default peripheral device selection based on location can also be presented to the user via user interface 500. For example, a link 520 can be displayed to the user that, when selected by the user, displays additional information describing the default peripheral device selection based on location and how it can be beneficial to the user.

Figure 6:
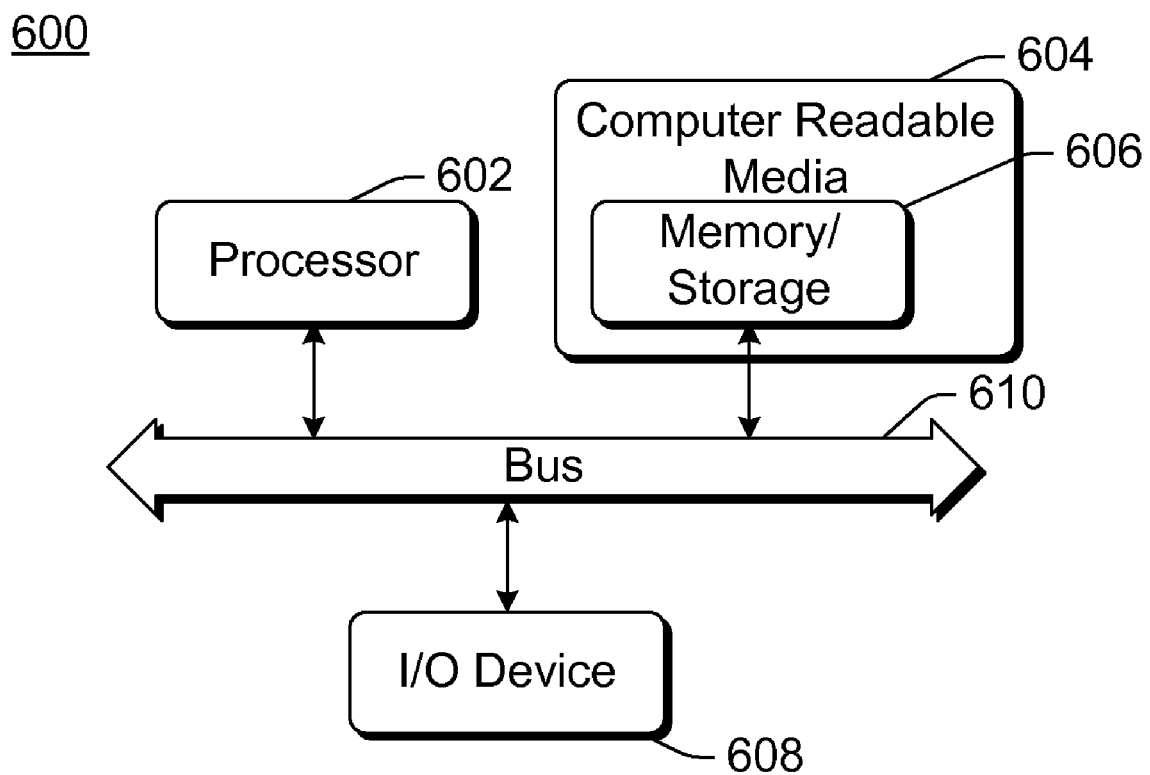
FIG. 6 illustrates an example computing device that can be configured to implement the default peripheral device selection based on location in accordance with one or more embodiments.

FIG. 6 illustrates an example computing device 600 that can be configured to implement the default peripheral device selection based on location in accordance with one or more embodiments. Computing device 600 can be, for example, computing device 102 of FIG. 1 or computing device 200 of FIG. 2.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or I/O device(s) 608 can be included as part of, or alternatively may be coupled to, computing device 600. Bus 610 represents one or more of any of several types of bus structures, including a memory bus or memory controller, a peripheral bus, an accelerated graphics port, and a processor or local bus using any of a variety of bus architectures. Bus 610 can include wired and/or wireless buses.

Memory/storage component 606 represents one or more computer storage media. Component 606 can include volatile media (such as random access memory (RAM)) and/or non-volatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by processing unit(s) 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, and so forth. Input/output devices 608 also include any of a variety of wired and/or wireless network adapters.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module," "functionality," and "logic" as used herein generally represent software, firmware, hardware, or combinations thereof. In the case of a software implementation, the module, functionality, or logic represents program code that performs specified tasks when executed on a processor (e.g., CPU or CPUs). The program code can be stored in one or more computer readable memory devices, further description of which may be found with reference to FIG. 6. The features of the default peripheral device selection based on location techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer hardware storage media having stored thereon multiple instructions that, when executed by one or more processors of a computing device, cause the one or more processors to:
   allow automatic default peripheral device selection based on a current location to be enabled and disabled;
   receive an identification of a peripheral device to set as a default peripheral device;
   determine whether automatic default peripheral device selection based on a current location is enabled;
   responsive to determining automatic default peripheral device selection based on a current location is disabled, set the received identified peripheral device as a single default device for the computing device; and
   responsive to determining automatic default peripheral device selection based on a current location is enabled, further cause the one or more processors to: obtain a current location of the computing device without user input specifying the current location;
   set the received identified peripheral device as a default device for the current location;
   detect a change in the current location of the computing device to a different location;
   access a mapping record of default peripheral devices to locations to identify a default peripheral device corresponding to the different location of the computing device; and
   return the identified default peripheral device as a current default peripheral device for the computing device.

2. One or more computer hardware storage media as recited in claim 1, wherein to obtain the current location of the computing device is to obtain a network location that identifies a network to which the computing device is currently coupled.

3. One or more computer hardware storage media as recited in claim 1, wherein to obtain the current location of the computing device is to obtain GPS coordinates indicating the current location of the computing device.

4. One or more computer hardware storage media as recited in claim 1, the instructions further causing the one or more processors to obtain the current location and access the mapping record to identify the default peripheral device corresponding to the current location of the computing device each time the current location of the computing device changes.

5. One or more computer hardware storage media as recited in claim 1, wherein the default peripheral devices comprise printers, and wherein the instructions further cause the one or more processors to obtain the current location, access the mapping record, and return the identified default peripheral device in response to a request to print a document being made.

6. One or more computer hardware storage media as recited in claim 1, the instructions further causing the one or more processors to maintain a mapping record of default peripheral devices to locations for each type of multiple different types of peripheral devices.

7. One or more computer hardware storage media as recited in claim 1, wherein the mapping record comprises a mapping of default printers to locations, and wherein the identified default peripheral device is an identified printer.

8. One or more computer hardware storage media having stored thereon multiple instructions that, when executed by one or more processors of a computing device, cause the one or more processors to: receive an identification of a peripheral device to be a default peripheral device; obtain a current location of the computing device without user input specifying the current location;
   store a mapping of the current location of the computing device to the identified default peripheral device; and
   display a user interface configured to allow automatic default peripheral device selection based on a current location of the computing device to be enabled and disabled, the user interface further configured to enable a user to select a particular peripheral device to set as a default peripheral device for a location only when automatic default peripheral device selection based on a location is enabled;

receive an identification of a peripheral device to be a default peripheral device; determine whether automatic default peripheral device selection based on a current location of the computing device is enabled;

responsive to determining automatic default peripheral device selection based on a current location is disabled, set the received identified peripheral device as a single default device for the computing device; and responsive to determining automatic default peripheral device selection based on a current location is enabled, further cause the one or more processors to: obtain a current location of the computing device without user input specifying the current location; and store a mapping of the current location of the computing device to the received identified peripheral device as a default device for the current location.

9. One or more computer hardware storage media as recited in claim 8, the instructions further causing the one or more processors to:

receive a user selection of a second location other than the current location of the computing device;

receive a user selection of a second peripheral device to be a default peripheral device for the second location; and store a mapping of the second location to the second peripheral device.

10. One or more computer hardware storage media as recited in claim 8, wherein to obtain the current location of the computing device is to obtain a network location that identifies a network to which the computing device is currently coupled.

11. One or more computer hardware storage media as recited in claim 8, wherein the peripheral device comprises a printer, and wherein the mapping comprises a mapping of the current location of the computing device to the identified printer.

12. One or more computer hardware storage media as recited in claim 8, the instructions further causing the one or more processors to display a user interface configured to enable a user of the computing device to select a particular one of multiple peripheral devices to be a default peripheral device for each of multiple locations.

13. One or more computer hardware storage media as recited in claim 8, wherein to store the mapping is to store the mapping in an operating system registry.

14. A method for displaying a user interface on a computing device, the method comprising:

displaying a user interface comprising a first portion including one or more options configured to allow a user to enable and disable automatic default peripheral device selection based on a current location of the computing device, wherein the current location of the computing device is detected without user input specifying the current location, wherein the default peripheral device is determined, at least in part, from a mapping record of default peripheral devices to locations;

displaying a second portion, within the user interface, including one or more options configured to enable the user to select a particular one of multiple peripheral devices to be a default peripheral device for each of multiple locations, at least one of the multiple locations comprising a "no network" location;

receiving an identification of a peripheral device to set as a default peripheral device;

determining whether automatic default peripheral device selection based on a current location is enabled;

responsive to determining automatic default peripheral device selection based on a current location is disabled, setting the received identification of a peripheral device as a single default device for the computing device; and responsive to determining automatic default peripheral device selection based on a current location is enabled, setting the received identification of a peripheral device as a default device for a current location of the computing device.

15. A method as recited in claim 14, wherein at least one of the multiple locations is a network location that identifies a network to which the computing device is coupled.

16. A method as recited in claim 14, the second portion further including one or more options configured to enable the user to add a mapping of a default peripheral device for the computing device to a location.

17. A method as recited in claim 14, the second portion further including one or more options configured to enable the user to remove a mapping of a default peripheral device for the computing device to a location.

* * * * *